US012802379B2

(12) United States Patent
Lu et al.

(10) Patent No.: US 12,802,379 B2
(45) Date of Patent: Nov. 17, 2026

(54) METHOD, SYSTEM, MEDIUM, AND DEVICE FOR DIGITALLY GENERATING PROTECTIVE CASES FOR THREE-DIMENSIONAL MODELS

(71) Applicant: Hangzhou Dianzi University, Hangzhou (CN)

(72) Inventors: Jianfeng Lu, Hangzhou (CN); Caijin Li, Hangzhou (CN); Zhihua Li, Hangzhou (CN); Xiangye Huang, Hangzhou (CN); Jiacheng Lin, Hangzhou (CN); Renlin Xin, Hangzhou (CN); Yiyang Hu, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 194 days.

(21) Appl. No.: 19/001,650

(22) Filed: Dec. 26, 2024

(65) Prior Publication Data

US 2025/0124681 A1 Apr. 17, 2025

(30) Foreign Application Priority Data

Mar. 13, 2024 (CN) ......................... 202410287076.0

(51) Int. Cl.

| | |
|---|---|
| ***G06T 19/20*** | (2011.01) |
| ***G06T 7/13*** | (2017.01) |
| ***G06T 17/20*** | (2006.01) |

(52) U.S. Cl.

CPC ................ *G06T 19/20* (2013.01); *G06T 7/13* (2017.01); *G06T 17/20* (2013.01); *G06T 2210/21* (2013.01); *G06T 2219/2016* (2013.01)

(58) Field of Classification Search

None

See application file for complete search history.

(56) References Cited

U.S. PATENT DOCUMENTS

| | | | |
|---|---|---|---|
| 2002/0075092 A1 | 6/2002 | Turcotte et al. | |
| 2015/0264246 A1 | 9/2015 | Sartor et al. | |
| 2018/0143589 A1 | 5/2018 | Gilles et al. | |
| 2019/0034056 A1* | 1/2019 | Eisenmann | G06T 19/20 |
| 2024/0116249 A1* | 4/2024 | Wan | B29C 64/386 |
| 2024/0272611 A1* | 8/2024 | Li | B33Y 50/00 |

* cited by examiner

*Primary Examiner* — Yi Wang

(74) *Attorney, Agent, or Firm* — Hemisphere Law, PLLC

(57) ABSTRACT

The present disclosure discloses a method, system, medium, and device for digitally generating protective cases for three-dimensional models. The method comprises: firstly, specifying an installation direction of a protective case model, and transforming coordinates of an input model using a coordinate transformation matrix; pre-processing the input model if it is not closed and then slicing the input model to obtain contour lines of each layer; constructing polygons by a symmetric difference operation, then performing surface reconstruction on the protective case model using a triangulation method, and finally outputting the protective case model. Compared with conventional manual design methods and manually-intervened digital design methods, the digital generation method with high automation in the present disclosure cuts down design time while ensuring the accuracy of the model and improving the production efficiency of protective cases through manual errors reduction.

22 Claims, 9 Drawing Sheets

(a) (b) (c) (d)

(a) (b) (c) (d)

METHOD, SYSTEM, MEDIUM, AND DEVICE FOR DIGITALLY GENERATING PROTECTIVE CASES FOR THREE-DIMENSIONAL MODELS

TECHNICAL FIELD

The present disclosure relates to the field of computer-aided design and geometric processing, and in particular, to a method, system, medium, and device for digitally generating protective cases for three-dimensional models.

BACKGROUND

Regarded as a shell model, a protective case, is ubiquitous in daily life and can fully protect valuables, especially when dealing with fragile products, such as glassware and ceramic vessels. These fragile products, often highly susceptible to damage and irreplaceable, may incur significant economic losses and resource waste once damaged during production, transportation or use.

Digitally generating protective cases can greatly optimize design and enhances cost control. Through precise simulation and analysis, as well as digital simulation, the performance differences among various design schemes can be accurately evaluated, and an optimal design scheme can be selected, thereby achieving maximum resource utilization and minimum cost expenditure. Digitization is of great significance in the application of protective cases to improve the safety and integrity of fragile products, reduce losses, increase efficiency, and foster sustainable development.

The predominant methods in the prior art for generating protective cases are still based on manual design. Both conventional manual design methods and manually-intervened digital design methods require professional designers for operations, which are inefficient, especially for valuables that require customized protective cases. In addition, manual design is prone to human factors, resulting in instability or inaccuracy in design. And in conventional technologies, iteration and optimization of design necessitate substantial time and resource investments. For example, in case of an error in design, the product may be discarded as waste and redesigned, making product improvement and optimization troublesome and challenging.

SUMMARY

The objective of the present disclosure is to solve the problems existing in the prior art and provide a method, system, medium, and device for digitally generating protective cases for three-dimensional models.

Specific technical solutions used by the present disclosure are as follows:

In a first aspect, the present disclosure provides a method for digitally generating protective cases for three-dimensional models, including the following steps:

S1. in a world coordinate system where a three-dimensional input model with a protective case to be generated is located, specifying a three-dimensional unit vector as an installation direction of a protective case model;

S2. constructing a reverse coordinate transformation matrix based on the installation direction of the protective case model, finding a reverse matrix of the reverse coordinate transformation matrix to obtain a coordinate transformation matrix, and transforming coordinates of the input model using the coordinate transformation matrix;

S3. determining whether the transformed input model is closed: pre-processing it if it is not closed; and skipping the pre-processing if it is closed;

S4. slicing the input model after the closure determination through a preset slice spacing to obtain contour lines of each layer of the input model;

S5. constructing corresponding two-dimensional polygons by a symmetric difference operation from the obtained contour lines and generating a polygon set;

S6. iteratively updating the generated polygons using a polygon update algorithm with a preset embedded parameter, to obtain updated polygons;

S7. converting the updated polygons back into corresponding new contour lines based on height coordinates, and saving all the new contour lines in a new contour line array in ascending order of height coordinates; and S8. performing surface reconstruction on the protective case model using a triangulation method based on the new contour lines, applying the reverse coordinate transformation matrix to a surface reconstruction result for reverse coordinate transformation, and outputting a protective case model after the reverse coordinate transformation, to complete digital generation of the protective case for the three-dimensional model.

Preferably, a specific process of the pre-processing is as follows:

S31. determining whether a current edge of the transformed input model belongs to only one triangular facet: if the current edge belongs to only one triangular facet without being shared by any others, determining that the current edge is a boundary of the transformed input model, and recording and storing the current edge in a boundary list; otherwise, skipping the recording and storage operation;

S32. when all edges of the transformed input model are traversed, determining whether the boundary list is empty: if it is empty, skipping the pre-processing; and if it is not empty, performing steps S33 to S35;

S33. traversing height coordinates of all points of the transformed input model, finding a maximum value and a minimum value among all the height coordinates, and applying a preset small offset to the maximum height coordinate value to obtain a new maximum height coordinate value as a height coordinate value of a final base plane;

S34. replacing the height coordinates of each point in the boundary list with the height coordinate value of the final base plane, to obtain corresponding projection points of each point in the boundary list on the final base plane; and S35. constructing new triangular facets based on all the points in the boundary list and their corresponding projection points, and adding the new triangular facets to the transformed input model.

Preferably, specific steps for obtaining the contour lines of each layer of the input model are as follows:

S41. initializing a cutting plane using the minimum height coordinate value, and determining whether there is an intersecting point between the initialized cutting plane and the input model after the closure determination: if there is only one intersecting point, skipping constructing contour lines, and updating the cutting plane only through the preset slice spacing; if there are intersecting lines, further determining whether triangular facets corresponding to the intersecting lines are adjacent; if the triangular facets are adjacent, recording coordinates of two endpoints of the intersecting lines and the triangular facets corresponding to the intersecting lines, connecting the intersecting lines to form a contour line, and updating the cutting plane through the preset slice spacing; if the triangular facets are not adjacent, skipping constructing contour lines, and updating the cutting plane only through the preset slice spacing; and if there is no intersecting point, performing step S5; and S42. continuously re-determining whether there is an intersecting point between the updated cutting plane and the input model after the closure determination until no intersecting point exists, and saving all the contour lines in a contour line array in ascending order of height coordinates.

Preferably, a specific process of the symmetric difference operation is as follows:

S51. designating the contour lines with same height coordinates as a same layer, and initializing the polygon set of each layer as empty;

S52. constructing a current polygon using a current contour line of a current layer, finding a symmetric difference between the current polygon and the polygon set of the current layer, designating a symmetric difference result as a new polygon set of the current layer until all the contour lines of the current layer are processed, to obtain a final result of the polygon set of the current layer; and S53. continuing to determine each contour line of a next layer until all layers of the input model are determined, saving all the two-dimensional polygons in a polygon array in ascending order of height coordinates, and saving all the polygon sets in a polygon set array in ascending order of height coordinates.

Preferably, in step S6, a specific process of iteratively updating the generated polygons using a polygon update algorithm is as follows:

S61. initializing a first element in the polygon set array as an upper-layer polygon set, with a constant value for the preset embedded parameter;

S62. selecting one of remaining elements as a current-layer polygon set after the first element is removed from the polygon set array; offsetting the upper-layer polygon set inward by the preset embedded parameter to obtain an inward-offset upper-layer polygon set; computing a union of the inward-offset upper-layer polygon set and the current-layer polygon set, updating the current-layer polygon set with an obtained union result, computing a union of the new current-layer polygon set and the upper-layer polygon set, and designating an obtained new union result as a new upper-layer polygon set; and S63. when all the remaining elements in the polygon set array are traversed, saving the updated polygon sets in a new polygon set array in ascending order of height coordinates.

Preferably, the embedded parameter is set to 0.03 mm.

Preferably, in step S8, a specific process of performing surface reconstruction on the protective case model using a triangulation method based on the new contour lines is as follows:

S81. designating two adjacent elements in the new contour line array as an upper layer and a lower layer respectively, calculating average distances between a currently unpaired new contour line in the upper layer and all the new contour lines in the lower layer, and determining whether the new contour line with the shortest average distance in the lower layer has completed triangulation: if the new contour line with the shortest average distance in the lower layer has not completed triangulation, matching it with the currently unpaired new contour line in the upper layer to obtain a matched contour line pair, and connecting the matched contour line pair by drawing lines between their nearest points to complete triangulation; and if the new contour line with the shortest average distance in the lower layer has completed triangulation, internally triangulating the currently unpaired new contour line in the upper layer; and S82. when all adjacent layers in the new contour line array complete triangulation, obtaining a surface reconstruction result.

In a second aspect, the present disclosure provides a system for digitally generating protective cases for three-dimensional models, including:

an installation direction specification module, configured to specify a three-dimensional unit vector as an installation direction of a protective case model in a world coordinate system where an input model with a protective case to be generated is located;

a transformation module, configured to construct a reverse coordinate transformation matrix based on the installation direction of the protective case model, find a reverse matrix of the reverse coordinate transformation matrix to obtain a coordinate transformation matrix, and transform coordinates of the input model using the coordinate transformation matrix;

a pre-processing module, configured to determine whether the transformed input model is closed: pre-process it if it is not closed; and skip the pre-processing if it is closed;

a contour line obtaining module, configured to slice the input model after the closure determination through a preset slice spacing to obtain contour lines of each layer of the input model;

a polygon generation module, configured to construct corresponding two-dimensional polygons by a symmetric difference operation from the obtained contour lines and generate a polygon set;

an iterative update module, configured to iteratively update the generated polygons using a polygon update algorithm with a preset embedded parameter, to obtain updated polygons;

a new contour line obtaining module, configured to convert the updated polygons back into corresponding new contour lines based on height coordinates, and save all the new contour lines in a new contour line array in ascending order of height coordinates; and a protective case output module, configured to perform surface reconstruction on the protective case model in combination with a triangulation method, apply the reverse coordinate transformation matrix to a surface reconstruction result for reverse coordinate transformation, and output a protective case model after the reverse coordinate transformation, to complete digital generation of the protective case for the three-dimensional model.

In a third aspect, the present disclosure provides a computer-readable storage medium, where the storage medium stores a computer program that, when executed by a processor, implements the method as described in any solution of the first aspect above.

In a fourth aspect, the present disclosure provides a computer electronic device, including a memory and a processor, where the memory is configured to store a computer program; and the processor is configured to execute the computer program to implement the method as described in any solution of the first aspect above.

Compared with the prior art, the present disclosure has the following beneficial effects:

By using a digital automatic generation algorithm, the present disclosure not only achieves a fully automatic process from inputting an item model to outputting a protective case model but also improves the efficiency of design and manufacturing through manual intervention reduction. According to the present disclosure, errors caused by human factors are eliminated, the stability of protective cases is improved, and product quality is ensured. In addition, for design optimization and iteration, data parameters of the input item model can be analyzed, and design optimization and iteration can be easily completed by adjusting the relevant parameters of the algorithm.

DETAILED DESCRIPTION OF THE EMBODIMENTS

In order to make the above objectives, features and advantages of the present disclosure more obvious and understandable, specific embodiments of the present disclosure will be described in detail below with reference to the accompanying drawings. Many specific details are elaborated in the following description to facilitate full understanding of the present disclosure. However, the present disclosure can be implemented in many other ways different from those described herein, and those skilled in the art can make similar improvements without violating the content of the present disclosure. Therefore, the present disclosure is not limited by the specific examples disclosed below. The technical features in various examples of the present disclosure can be combined accordingly without conflicting with each other.

In a preferred example of the present disclosure, a method for digitally generating protective cases for three-dimensional models is provided, which can automatically generate a corresponding protective case model only by inputting a three-dimensional original model (an item to be protected), an installation direction (an insertion direction of a protective case into the item), and an embedded parameter (to ensure that the finally generated protective case can fit and latch onto the item without easy detachment).

The specific steps of the method are as follows:

S1. In a world coordinate system where a three-dimensional input model with a protective case to be generated is located, a three-dimensional unit vector is specified as an installation direction of a protective case model.

Figure 1:
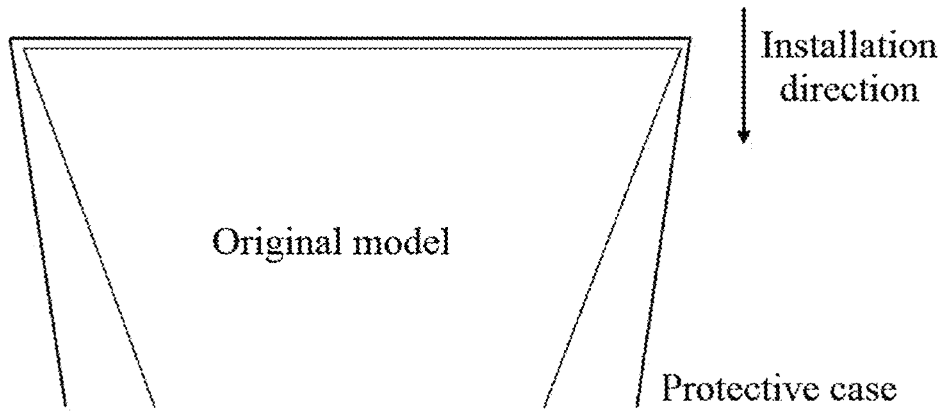
FIG. 1 is a schematic view of an installation direction of a protective case model according to an example of the present disclosure.

It should be noted that in step S1 of the present disclosure, the installation direction of the protective case model refers to an insertion direction of the finally generated protective case model (shell model) nested onto the input model. As shown in FIG. 1, the thinner black line represents the input model (original model), while the thicker black line represents the protective case model (shell model). A three-dimensional unit vector is specified as the installation direction in the world coordinate system where the input model is located, and a coordinate value of the three-dimensional unit vector is stored in a three-dimensional array dir[3]. In FIG. 1, the installation direction is vertically downward, corresponding to the three-dimensional unit vector (0, 0, −1).

S2. A reverse coordinate transformation matrix is constructed based on the installation direction of the protective case model, a reverse matrix of the reverse coordinate transformation matrix is found to obtain a coordinate transformation matrix, and coordinates of the input model are transformed using the coordinate transformation matrix.

Figure 2:
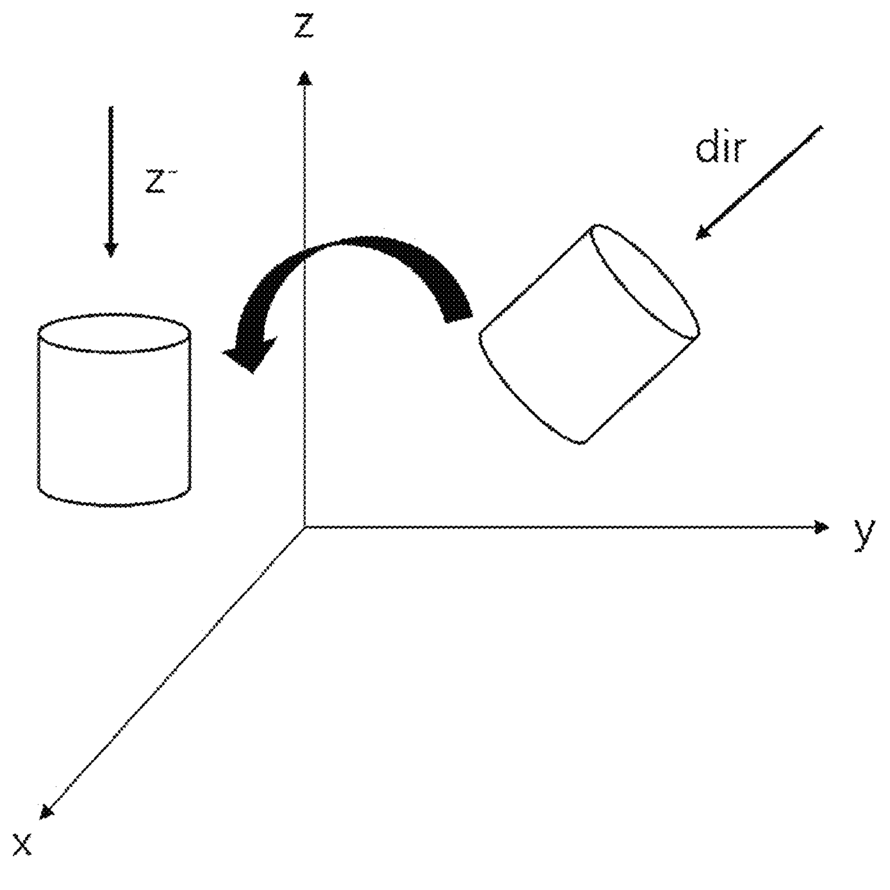
FIG. 2 is a schematic view of coordinate transformation of an input model according to an example of the present disclosure.

It should be noted that in step S2 of the present disclosure, the coordinate transformation matrix is usually a 4×4 matrix, which is used for transforming the position of the input model, so that the input model is relocated in a new position after coordinate transformation. The right of FIG. 2 shows a negative z-axis direction (0, 0, −1) as the installation direction, and the effect of coordinate transformation on the input model is shown on the left of FIG. 2. It can be seen that the coordinate transformation is equivalent to transforming the input model such that it aligns with the installation direction (0, 0, −1) at its original position.

During the construction of the coordinate transformation matrix, it is considered a special direction when the three-dimensional array dir[3] is consistent with the positive z-axis direction of the world coordinate system, and no coordinate transformation is required. Conversely, it is considered a general direction when the three-dimensional array dir[3] is inconsistent with the positive z-axis direction of the world coordinate system, a cross-product of the three-dimensional array dir[3] and a z-axis unit vector (0, 0, 1) is calculated to obtain a vector representing a rotation axis, and then the vector is stored in a rotation axis array rotateAxis [3]; then, a dot product of the three-dimensional array dir[3] and the z-axis unit vector (0, 0, 1) is calculated to obtain a scalar rotateAngle representing a rotation angle. Using the array rotateAxis[3] and the scalar rotateAngle, a reverse coordinate transformation matrix reverseMatrix equivalent to rotating around rotateAxis[3] by rotateAngle is constructed, whose reverse is returned as a coordinate transformation matrix projectMatrix. Given that that the unit vector of the rotation axis is (a, b, c) and the rotation angle is θ, the corresponding 4×4 coordinate transformation matrix is in the following form:

$$\begin{bmatrix} a^2+(1-a^2)\cos\theta & a*b*(1-\cos\theta)-c*\sin\theta & a*c*(1-\cos\theta)+b*\sin\theta \\ a*b*(1-\cos\theta)+c*\sin\theta & b^2+(1-b^2)\cos\theta & b*c*(1-\cos\theta)-a*\sin\theta \\ a*c*(1-\cos\theta)-b*\sin\theta & b*c*(1-\cos\theta)+a*\sin\theta & c^2+(1-c^2)\cos\theta \\ 0 & 0 & 0 \end{bmatrix}$$

After the coordinate transformation matrix is constructed, coordinate transformation on the input model begins. Firstly, three-dimensional coordinates (Px, Py, Pz) of each point in the input model are expanded by an additional dimension to obtain four-dimensional homogeneous coordinates (Px, Py, Pz, 1) of each point; then the four-dimensional homogeneous coordinates of the input model are multiplied by the coordinate transformation matrix projectMatrix to obtain coordinates (Px_new, Py_new, Pz_new, 1) of each new point after the input model is transformed; the first three dimensions of the transformed coordinates are taken as new coordinates (Px_new, Py_new, Pz_new) of each point in the input model. Until all points in the input model are traversed and corresponding new coordinates of each point are obtained, the coordinate transformation on the input model is achieved.

S3. Whether the transformed input model is closed is determined: the transformed input model is pre-processed if it is not closed; and the pre-processing is skipped if it is closed.

It should be noted that in step S3 of the present disclosure, in order to satisfy subsequent processing conditions, whether the transformed input model is closed is first determined for pre-processing to ensure that contour lines sliced subsequently are closed. If the input model is closed, the pre-processing step is directly skipped; and if the input model is not closed but rather an open surface with boundaries, the pre-processing is performed as follows:

S31. Whether a current edge of the transformed input model belongs to only one triangular facet is determined: if the current edge belongs to only one triangular facet without being shared by any others, it is determined that the current edge is a boundary of the transformed input model, and the current edge is recorded and stored in a boundary list; otherwise (the current edge does not belong to only one triangular facet and is shared by other triangular facets), it indicates that the edge is not a boundary of the transformed input model and does not need to be stored in the boundary list.

S32. When all edges of the transformed input model are traversed, whether the boundary list is empty is determined; if it is empty, the pre-processing is skipped; if it is not empty, steps S33 to S35 are performed.

It should be noted that in steps S31 and S32 of this example, for a certain edge of the transformed input model, if the edge belongs to only one triangular facet (triangular mesh, or triangular facet, is, the most commonly used basic unit in in computer-aided design, because the data stored in a computer is discrete and many triangular facets are required to approximate a three-dimensional model) and no other triangular facets share the edge, it is determined that the edge is a boundary of the input model, and the edge is recorded and stored in the boundary list listBoundary. After all edges of the input model are traversed, if listBoundary is empty, it indicates that the input model has no boundaries, that is, the input model is closed and does not require pre-processing. In this case, next step S4 is directly performed; otherwise, if listBoundary is not empty, S33 to S35 are further performed.

S33. Height coordinates of all points of the transformed input model are traversed, a maximum value and a minimum value are found among all the height coordinates, and a preset small offset is applied to the maximum height coordinate value to obtain a new maximum height coordinate value as a height coordinate value of a final base plane.

It should be noted that in step S33 of this example, the height coordinates (z coordinates) of all the points of the transformed input model are traversed, the maximum value maxZ and the minimum value minZ among all the height coordinates are recorded, and the preset small offset k is applied to the maximum height coordinate value maxZ to obtain a larger height coordinate value as the height coordinate value of the final base plane. A new maximum height coordinate value is finally obtained as the height coordinate value maxZ+k of the final base plane.

S34. The height coordinates of each point in the boundary list are replaced with the height coordinate value of the final base plane, to obtain corresponding projection points of each point in the boundary list on the final base plane.

S35. New triangular facets are constructed based on all the points in the boundary list and their corresponding projection points, and the new triangular facets are added to the transformed input model.

Figure 3:
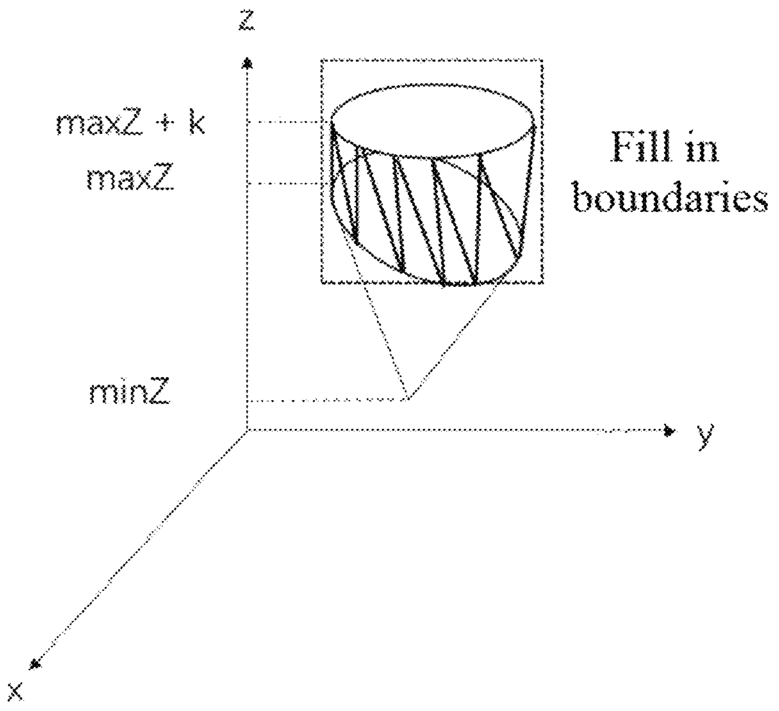
FIG. 3 is a schematic view of pre-processing an input model according to an example of the present disclosure.

It should be noted that in steps S34 and S35 of this example, each point (xi, yi, zi) belonging to a boundary of the input model is traversed, and the height coordinate (z coordinate) of the point is correspondingly modified to the height coordinate value maxZ+k of the final base plane to obtain the corresponding projection point of the point on the final base plane z1=maxZ+k. The new triangular facets are constructed based on the points on the boundaries of the input model and their corresponding projection points, which establishes a new topology structure to extend the boundaries of the input model to a specified projection plane, thereby ultimately achieving an effect of filling in the boundaries. As shown in FIG. 3, the triangular facets corresponding to the black thick lines are those newly added, while the unframed portion represents the original input model. After the points on the boundaries are projected onto the new plane, it can be seen that the framed portion well fills in the boundaries.

S4. The input model after the closure determination in step S3 is sliced through a preset slice spacing to obtain contour lines of each layer of the input model.

It should be noted that in step S4 of the present disclosure, the input model after undergoing step S3 is closed. Obviously, when a cutting plane parallel to the xOy plane is used to cut the input model after S3, if there is an intersecting point between the cutting plane and the input model, the cut contour lines are necessarily closed. Then, the input model after S3 is sliced through the specified slice spacing to obtain the contour lines of each layer.

Specific steps for obtaining the contour lines of each layer of the input model are as follows:

S41. A cutting plane is initialized using the minimum height coordinate value, and whether there is an intersecting point between the initialized cutting plane and the input model after the closure determination is determined: if there is only one intersecting point, construction of contour lines is skipped, and the cutting plane is updated only through the preset slice spacing; if there are intersecting lines, whether triangular facets corresponding to the intersecting lines are adjacent is further determined; if the triangular facets are adjacent, coordinates of two endpoints of the intersecting lines and the triangular facets corresponding to the intersecting lines are recorded, the intersecting lines are connected to form a contour line, and the cutting plane is updated through the preset slice spacing; if the triangular facets are not adjacent, the construction of contour lines is skipped, and the cutting plane is updated only through the preset slice spacing; and if there is no intersecting point, step S5 is performed; and S42. Whether there is an intersecting point between the updated cutting plane and the input model after the closure determination is continuously re-determined until no intersecting point exists, and all the contour lines are saved in a contour line array in ascending order of height coordinates.

It should be noted that in steps S41 and S42 of this example, the cutting plane is initialized using the minimum height coordinate value (z2=minZ), and the intersection determination is performed between the initialized cutting plane z2 and each triangular facet of the input model after the closure determination to determine whether there is an intersecting point:

1) When there is only one intersecting point between the initialized cutting plane and the input model after the closure determination, contour lines cannot be constructed, so this process is skipped, and the cutting plane is updated only through the preset slice spacing (z2=z2+spacing);
2) When there are no intersecting lines between the initialized cutting plane and the input model after the closure determination, it indicates that the current height coordinate value is greater than maxZ+k, the cutting plane will consequently not intersect the input model after the closure determination, step S4 ends, and step S5 will be performed; and
3) When there are intersecting lines between the initialized cutting plane and the input model after the closure determination, whether the triangular facets corresponding to the intersecting lines are adjacent is further determined:

If the triangular meshes are adjacent, the coordinates of the two endpoints of the intersecting lines and the triangular facets corresponding to the intersecting lines are recorded, the intersecting lines are then connected to form a contour line, and the cutting plane is updated through the preset slice spacing. An intersecting line here is a very small line segment in a triangular facet, as shown in line segments L1 and L2 in FIG. 4(*a*). The recorded triangular facets are clustered and grouped (i.e., two adjacent triangular facets fall into a group), and corresponding intersecting lines of triangular facets in the same group are connected (i.e., adjacent intersecting lines are continuously drawn) to finally obtain a closed cutting contour line. A plurality of closed contour lines are obtained from multiple groups of adjacent triangular facets.

If the triangular facets are not adjacent, the construction of contour lines is skipped, and the cutting plane is updated only through the preset slice spacing.

Figure 4:
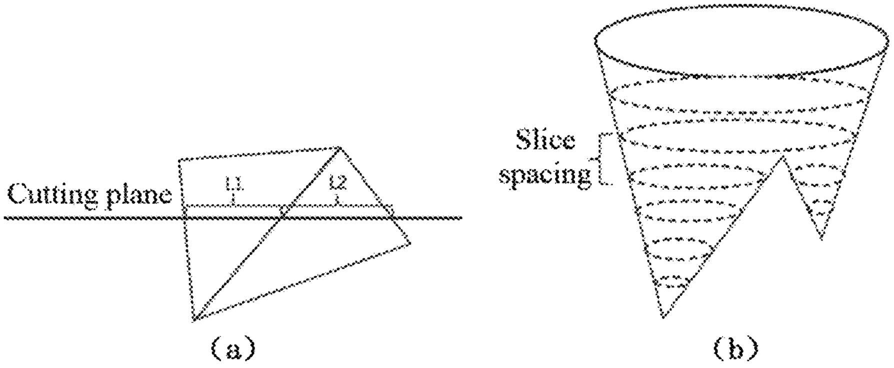
FIG. 4 is a schematic view of obtaining contour lines of each layer of the input model according to an example of the present disclosure, where (a) is a schematic view of intersecting lines between a cutting plane and triangular meshes of the input model, and (b) is a schematic view of multi-layer contour lines of the input model.

After the contour lines of the current layer are obtained, all the closed contour lines of the current layer are recorded and saved, and the cutting of a next layer is continued to obtain contour lines of the next layer, as shown in FIG. 4(*b*). Then, whether there is an intersecting point between the updated cutting plane and the input model after the closure determination is continuously determined until no intersecting point exists, and all the contour lines are saved in the contour line array in ascending order of height coordinates.

In addition, it should be noted that in step S4 of the present disclosure, the slice spacing can be adjusted according to the actual situation. In this example, the slice spacing is set to 0.1 mm. Moreover, in step S3 of this example, the small offset k is set to five times the spacing, i.e., 0.5 mm.

S5. Corresponding two-dimensional polygons are constructed by a symmetric difference operation from the obtained contour lines of each layer of the input model, and a polygon set is generated.

Figure 5:
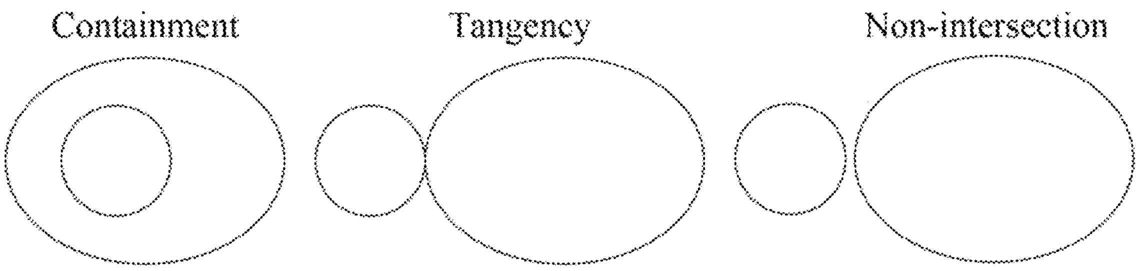
FIG. 5 is a schematic view of three possible relationships between closed contour lines of each layer according to an example of the present disclosure.

It should be noted that in step S5 of the present disclosure, the closed contour lines of each layer of the input model are obtained by the cutting operation in step S4. For the contour lines of a certain layer, the following three cases may occur: one contour line contains another; one contour line is tangent to another; the two contour lines do not intersect. As shown in FIG. 5, in order to construct the polygons corresponding to the facets of each layer, for the first case (containment), a difference set between a large closed contour line and a small closed contour line is required (i.e., large circle minus small circle), while for the other two cases (tangency and non-intersection), a union is directly computed and the polygons corresponding to the facets of each layer can be constructed.

Further, in the present disclosure, the symmetric difference (XOR) operation can be used to construct the polygons of each layer for the above three cases.

A specific process of the symmetric difference operation is as follows:

S51. The contour lines with same height coordinates are designated as contour lines of a same layer, and the polygon set result of each layer is initialized as empty.

S52. A polygon is constructed using a current closed contour line of a current layer, a symmetric difference between the polygon and the polygon set of the current layer is found, and a symmetric difference result is designated as a new polygon set of the current layer until all the contour lines of the current layer are processed, to obtain a final result of the polygon set of the current layer.

It should be noted that in step S52 of this example, the contour line is a closed polyline composed of multiple connected segments, allowing a closed contour line to be constructed into a polygon. The symmetric difference result between the polygon represented by the current polyline and the polygon set of the current layer is used to update the polygon set of the current layer.

S53. Each contour line of a next layer continues to be determined until all layers of the input model are determined, all the two-dimensional polygons are saved in a polygon array in ascending order of height coordinates, and all the polygon sets are saved in a polygon set array in ascending order of height coordinates.

It should be noted that in step S53 of this example, the polygon set of the current layer and its corresponding height coordinates are saved. When saving, one layer corresponds to one unique height, because the slicing is performed based on the height coordinates. When the current layer is not the last one, the process continues to construct polygons of the next layer.

S6. The generated polygons are iteratively updated using a polygon update algorithm with a preset embedded parameter, to obtain updated polygons.

Figure 6:
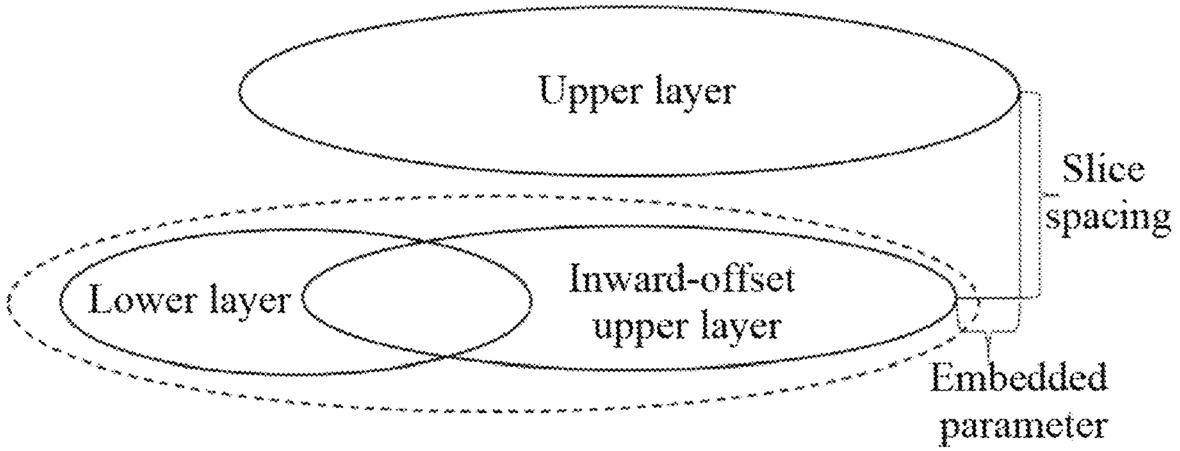
FIG. 6 is a schematic view of iteratively updating generated polygons according to an example of the present disclosure.

It should be noted that in step S6 of the present disclosure, in order to generate a protective case model with good performance that can be nested with the input model without loosening, the lower part of the protective case model should have an inward-contracted buckle design, as shown in FIG. 6. Therefore, an embedded parameter depth is set in step S6 to ensure that the finally generated protective case model can fit and latch onto the input model without easy detachment.

Further, a specific process of step S6 in the present disclosure is as follows:

S61. A first element in the polygon set array is initialized as an upper-layer polygon set upperMultiPolygon, with a constant value for the preset embedded parameter depth;

S62. One of remaining elements is selected as a current-layer polygon set lowerMultiPolygon after the first element is removed from the polygon set array; the upper-layer polygon set upperMultiPolygon is offset inward by the preset embedded parameter to obtain an inward-offset upper-layer polygon set upperOffsetMulitPolygon; a union of upperOffsetMulitPolygon and lowerMultiPolygon is computed, the current-layer polygon set is updated with an obtained union result, a union of the new current-layer polygon set and the upper-layer polygon set upperMultiPolygon is computed, and an obtained new union result is designated as a new upper-layer polygon set; and S63. When all the remaining elements in the polygon set array are traversed, the updated polygon sets are saved in a new polygon set array in ascending order of height coordinates.

In addition, it should be noted that in step S6 of the present disclosure, the embedded parameter can be adjusted according to the actual situation. In this example, the embedded parameter depth is set to 0.03 mm.

S7. The updated polygons are converted back into corresponding new contour lines based on height coordinates, and all the new contour lines are saved in a new contour line array in ascending order of height coordinates.

It should be noted that in step S7 of the present disclosure, after the polygons of each layer are updated (the slices of each layer are updated), the contour lines corresponding to the slices of each layer can be reconstructed, and the new contour lines of each layer can be used to construct the final protective case model.

Figure 7:
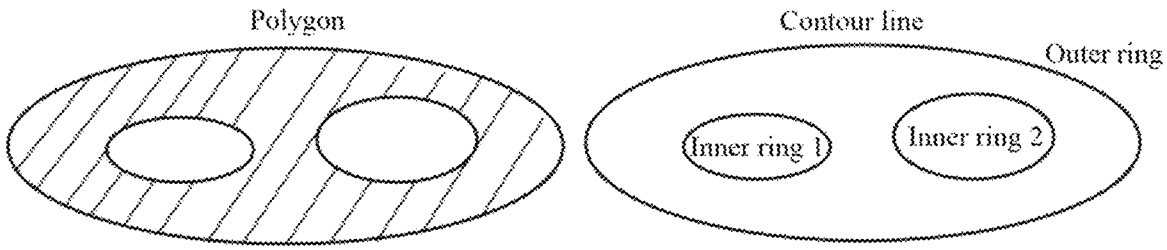
FIG. 7 is a schematic view of obtaining corresponding closed contour lines through polygons according to an example of the present disclosure.

Further, a specific process of step S7 in the example of the present disclosure is as follows:

For the updated current-layer polygon set multiPolygon, all rings (both outer and inner rings) of each polygon belonging to the same layer of slices are converted into a plurality of closed contour lines. Since the polygons are two-dimensional, the resulting contour lines are also two-dimensional at this stage. Therefore, the height coordinates of the slices of each layer saved in step S5 are required for restoring the height information of the contour lines, that is, a height coordinate value is added to each contour line. Each polygon in the polygon set of the current layer is traversed (there may be a plurality of polygons in a single layer). It is noted that the polygons may have internal voids. Here, it is assumed that the polygon must have an outer contour (1 outer ring) and may have a plurality of inner contours representing voids (0 or more inner rings), as shown in FIG. 7. The above operation is performed on the polygon sets of each layer, and new three-dimensional closed contour lines of each layer are finally obtained.

S8. Surface reconstruction is performed on the protective case model using a triangulation method based on the new contour lines, the reverse coordinate transformation matrix is applied to a surface reconstruction result for reverse coordinate transformation, and a protective case model after the reverse coordinate transformation is output, to complete digital generation of the protective case for the three-dimensional model.

It should be noted that in step S8 of the present disclosure, a specific process of performing surface reconstruction on the protective case model using a triangulation method based on the new contour lines is as follows:

S81. Two adjacent elements in the new contour line array are designated as an upper layer and a lower layer respectively, average distances between a currently unpaired new contour line in the upper layer and all the new contour lines in the lower layer are calculated, and whether the new contour line with the shortest average distance in the lower layer has completed triangulation is determined:

1) If the new contour line with the shortest average distance in the lower layer has not completed triangulation, it is matched with the currently unpaired new contour line in the upper layer to obtain a matched contour line pair, and the matched contour line pair is connected by drawing lines between their nearest points to complete triangulation; and 2) If the new contour line with the shortest average distance in the lower layer has completed triangulation, the currently unpaired new contour line in the upper layer is triangulated internally.

S82. When all adjacent layers in the new contour line array complete triangulation, a surface reconstruction result is obtained, to achieve the surface reconstruction from multiple layers of contour lines to the protective case model.

Notably, when the average distances are calculated in step S81 of this example, the remaining unmatched new contour lines in the upper layer after the previous matching process are first found, and then the average distances between these unmatched new contour lines and all the new contour lines in the lower layer are calculated. Specifically, there are initially 10 new contour lines in the upper layer, each with 5 points, and 10 new contour lines in the lower layer, each with 10 points. After one matching process, if 5 new contour lines in the upper layer remain unmatched, one of these unmatched contour lines is selected as the current new contour line in the upper layer. Subsequently, 1 new contour line is selected from all the new contour lines in the lower layer as the current new contour line in the lower layer, then the distances between the 5 points on the current new contour line in the upper layer and the 10 points on the current new contour line in the lower layer are calculated, and the resulting distances are averaged as an average distance between the current new contour line in the upper layer and the current new contour line in the lower layer. By analogy, 1 new contour line is reselected from all the new contour lines in the lower layer as the current new contour line, and an average distance is recalculated until the calculation of average distances for all the new contour lines in the lower layer is completed.

It should be noted that in this example, if there are multiple new contour lines with the shortest average distance in the lower layer, intersection-union ratios of the updated polygons corresponding to the new contour lines in the lower layer need to be calculated, the updated polygon with the larger intersection-union ratio value is selected, and then the unique new contour line with the shortest average distance in the lower layer is determined. Moreover, in step S81, all the contour lines in the upper layer are traversed before traversing all the contour lines in the lower layer. For all currently unpaired new contour lines in the upper layer, contour lines in the lower layer that overlap with them are determined and marked, and these overlapping contour lines are recorded in an overlap list. Each currently unpaired new contour line in the upper layer has its own overlap list; and then the nearest contour line in the lower layer, i.e., the contour line in the lower layer corresponding to the maximum overlap, is found in the overlap list and paired with the new contour line in the upper layer, indicating that the found contour line in the lower layer is the most similar to the contour line in the upper layer. Of course, a proportional threshold is set to ensure that the areas of the two contour lines do not differ too much, as shown on the left of FIG. 8.

Figure 8:
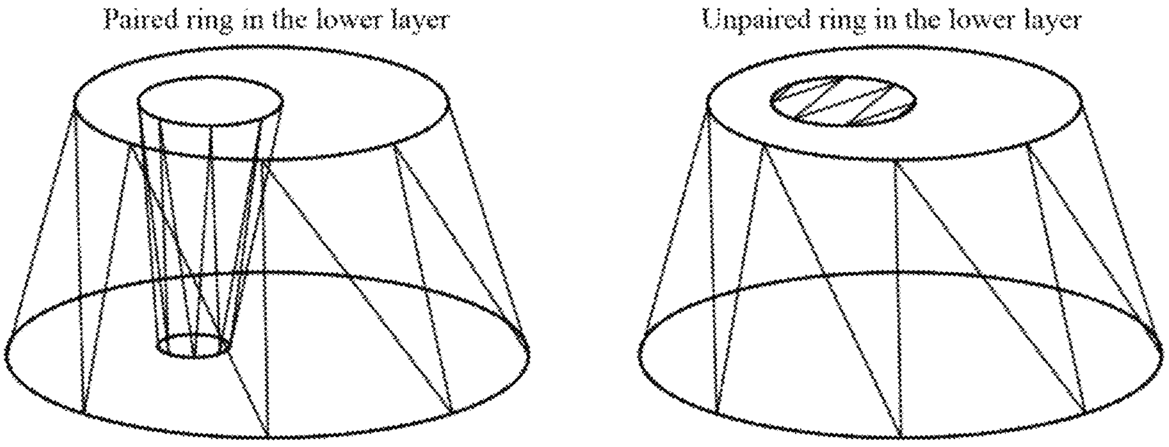
FIG. 8 is a schematic view of triangulation between adjacent upper and lower layers according to an example of the present disclosure.

It should be noted that in step S81 of this example, if the new contour line with the shortest average distance in the lower layer has completed triangulation, the currently unpaired new contour line in the upper layer is directly triangulated internally, as shown on the right of FIG. 8. By repeating step S81, the triangulation between all adjacent layers is completed, and the surface reconstruction from multiple layers of contour lines to the protective case model is ultimately achieved.

In addition, it should be noted that after the surface reconstruction on the protective case model, reverse coordinate transformation needs to be performed on the surface reconstruction result using the reverse coordinate transformation matrix, to output the protective case model. Specifically, the input model and the coordinate transformation matrix projectMatrix are multiplied for one coordinate transformation in step S2. Therefore, after the surface reconstruction on the protective case model is completed, the protective case model needs to be transformed back to the original coordinate system, that is, the corresponding reverse transformation is performed on the surface-reconstructed protective case model. Firstly, the three-dimensional coordinates (Px2, Py2, Pz2) of each point in the protective case model are expanded by one dimension to obtain four-dimensional homogeneous coordinates (Px2, Py2, Pz2, 1) of each point. Then, the four-dimensional homogeneous coordinates of each point in the protective case model are multiplied by the reverse coordinate transformation matrix reverseMatrix to obtain new points (Px2_new, Py2_new, Pz2_new, 1) after the protective case model is transformed, and the first three dimensions of the coordinate data are taken as new coordinates (Px2_new, Py2_new, Pz2_new) of each point in the protective case model until all points in the protective case model are traversed and corresponding new coordinates are obtained, thereby achieving the reverse coordinate transformation of the protective case model.

Figure 9:
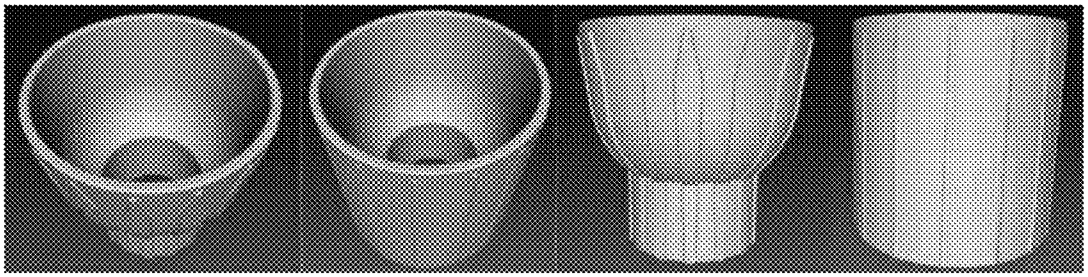
FIG. 9 is an effect view of a protective case model generated according to an example of the present disclosure, where (a) and (c) are views of the input model from different perspectives respectively, and (b) and (d) are views of the protective case model from different perspectives respectively.

A final effect is as shown in FIG. 9. It can be seen that the generated protective case model can effectively envelop the entire input model and is slightly embedded, so that the protective case model can fit securely without easy detachment (in practical applications, the protective case model is offset inward slightly and can well fit onto the input model). The method of the present disclosure is relatively robust and capable of handling complex three-dimensional original models.

In addition, it should be noted that the method for digitally generating protective cases for three-dimensional models in the above examples can essentially be executed by a computer program or modules. Therefore, based on the same inventive concept, another preferred example of the present disclosure further provides a system for digitally generating protective cases for three-dimensional models corresponding to the method provided in the above examples, including:

an installation direction specification module, configured to specify a three-dimensional unit vector as an installation direction of a protective case model in a world coordinate system where an input model with a protective case to be generated is located;

a transformation module, configured to construct a reverse coordinate transformation matrix based on the installation direction of the protective case model, find a reverse matrix of the reverse coordinate transformation matrix to obtain a coordinate transformation matrix, and transform coordinates of the input model using the coordinate transformation matrix;

a pre-processing module, configured to determine whether the transformed input model is closed: preprocess it if it is not closed; and skip the pre-processing if it is closed;

a contour line obtaining module, configured to slice the input model after the closure determination through a preset slice spacing to obtain contour lines of each layer of the input model;

a polygon generation module, configured to construct corresponding two-dimensional polygons by a symmetric difference operation from the obtained contour lines and generate a polygon set;

an iterative update module, configured to iteratively update the generated polygons using a polygon update algorithm with a preset embedded parameter, to obtain updated polygons;

a new contour line obtaining module, configured to convert the updated polygons back into corresponding new contour lines based on height coordinates, and save all the new contour lines in a new contour line array in ascending order of height coordinates; and a protective case output module, configured to perform surface reconstruction on the protective case model in combination with a triangulation method, apply the reverse coordinate transformation matrix to a surface reconstruction result for reverse coordinate transformation, and output a protective case model after the reverse coordinate transformation, to complete digital generation of the protective case for the three-dimensional model.

Similarly, based on the same inventive concept, another preferred example of the present disclosure further provides a computer electronic device corresponding to the method provided in the above examples, including a memory and a processor, where the memory is configured to store a computer program; and the processor is configured to execute the computer program to implement the method in the above examples.

Moreover, logical instructions in the above memory can be implemented in a form of software functional units and stored in a computer-readable storage medium when being sold or used as an independent product. Based on such an understanding, the technical solutions of the present disclosure essentially, or the part contributing to the prior art, or some of the technical solutions can be embodied in a form of a computer software product stored in a storage medium.

This product includes a plurality of instructions for instructing a computer device (such as a personal computer, a server, a network device, etc.) to perform all or some of the steps of the method in the examples of the present disclosure.

Thus, based on the same inventive concept, another preferred example of the present disclosure further provides a computer-readable storage medium corresponding to the method provided in the above examples. The storage medium stores a computer program that, when executed by a processor, implements the method in the above examples.

It should be understood that the above storage medium may include random access memories (RAMs) and non-volatile memories (NVMs), such as at least one disk memory. Meanwhile, the storage medium may alternatively be various media that can store program codes, such as USB drives, portable hard drives, magnetic disks, or optical disks.

It also should be understood that the above processor may be a general-purpose processor, including a central processing unit (CPU), a network processor (NP), a digital signal processor (DSP), an application specific integrated circuit (ASIC), a field-programmable gate array (FPGA), or other programmable logic devices, discrete gates or transistor logic devices, or discrete hardware components.

In addition, it should be noted that a person skilled in the art can clearly understand that, for the sake of convenience and simplicity in description, the specific working process of the system described above can refer to the corresponding process in the aforementioned examples related to the method, and will not be repeated here. In various examples provided in the present disclosure, the division of the steps or modules in the system and method is merely a logical functional division. In actual implementation, there may be other division methods, for example, a plurality of modules or steps may be combined or integrated together, and a module or step may be split.

The above examples are only preferred solutions of the present disclosure, and are not intended to limit the present disclosure. A person of ordinary skill in the art can make various changes and variations without departing from the spirit and scope of the present disclosure. Therefore, any technical solution obtained by equivalent substitutions or equivalent transformations falls within the scope of protection of the present disclosure.

The invention claimed is:

1. A method for digitally generating protective cases for three-dimensional models, comprising the following steps:

S1. in a world coordinate system where a three-dimensional input model with a protective case to be generated is located, specifying a three-dimensional unit vector as an installation direction of a protective case model;

S2. constructing a reverse coordinate transformation matrix based on the installation direction of the protective case model, finding a reverse matrix of the reverse coordinate transformation matrix to obtain a coordinate transformation matrix, and transforming coordinates of the input model using the coordinate transformation matrix;

S3. determining whether the transformed input model is closed: pre-processing it if it is not closed; and skipping the pre-processing if it is closed;

S4. slicing the input model after the closure determination through a preset slice spacing to obtain contour lines of each layer of the input model;

S5. constructing corresponding two-dimensional polygons by a symmetric difference operation from the obtained contour lines and generating a polygon set;

S6. iteratively updating the generated polygons using a polygon update algorithm with a preset embedded parameter, to obtain updated polygons;

S7. converting the updated polygons back into corresponding new contour lines based on height coordinates, and saving all the new contour lines in a new contour line array in ascending order of height coordinates; and S8. performing surface reconstruction on the protective case model using a triangulation method based on the new contour lines, applying the reverse coordinate transformation matrix to a surface reconstruction result for reverse coordinate transformation, and outputting a protective case model after the reverse coordinate transformation, to complete digital generation of the protective case for the three-dimensional model.

2. The method for digitally generating protective cases for three-dimensional models according to claim 1, wherein a specific process of the pre-processing is as follows:

S31. determining whether a current edge of the transformed input model belongs to only one triangular facet: if the current edge belongs to only one triangular facet without being shared by any others, determining that the current edge is a boundary of the transformed input model, and recording and storing the current edge in a boundary list; otherwise, skipping the recording and storage operation;

S32. when all edges of the transformed input model are traversed, determining whether the boundary list is empty; if it is empty, skipping the pre-processing; and if it is not empty, performing steps S33 to S35;

S33. traversing height coordinates of all points of the transformed input model, finding a maximum value and a minimum value among all the height coordinates, and applying a preset small offset to the maximum height coordinate value to obtain a new maximum height coordinate value as a height coordinate value of a final base plane;

S34. replacing the height coordinates of each point in the boundary list with the height coordinate value of the final base plane, to obtain corresponding projection points of each point in the boundary list on the final base plane; and S35. constructing new triangular facets based on all the points in the boundary list and their corresponding projection points, and adding the new triangular facets to the transformed input model.

3. The method for digitally generating protective cases for three-dimensional models according to claim 2, wherein specific steps for obtaining the contour lines of each layer of the input model are as follows:

S41. initializing a cutting plane using the minimum height coordinate value, and determining whether there is an intersecting point between the initialized cutting plane and the input model after the closure determination: if there is only one intersecting point, skipping constructing contour lines, and updating the cutting plane only through the preset slice spacing; if there are intersecting lines, further determining whether triangular facets corresponding to the intersecting lines are adjacent; if the triangular facets are adjacent, recording coordinates of two endpoints of the intersecting lines and the triangular facets corresponding to the intersecting lines, connecting the intersecting lines to form a contour line, and updating the cutting plane through the preset slice spacing; if the triangular facets are not adjacent, skipping constructing contour lines, and updating the cutting plane only through the preset slice spacing; and if there is no intersecting point, performing step S5; and S42. continuously re-determining whether there is an intersecting point between the updated cutting plane and the input model after the closure determination until no intersecting point exists, and saving all the contour lines in a contour line array in ascending order of height coordinates.

4. The method for digitally generating protective cases for three-dimensional models according to claim 3, wherein a specific process of the symmetric difference operation is as follows:

S51. designating the contour lines with same height coordinates as a same layer, and initializing the polygon set of each layer as empty;

S52. constructing a current polygon using a current contour line of a current layer, finding a symmetric difference between the current polygon and the polygon set of the current layer, designating a symmetric difference result as a new polygon set of the current layer until all the contour lines of the current layer are processed, to obtain a final result of the polygon set of the current layer; and S53. continuing to determine each contour line of a next layer until all layers of the input model are determined, saving all the two-dimensional polygons in a polygon array in ascending order of height coordinates, and saving all the polygon sets in a polygon set array in ascending order of height coordinates.

5. The method for digitally generating protective cases for three-dimensional models according to claim 4, wherein in step S6, a specific process of iteratively updating the generated polygons using a polygon update algorithm is as follows:

S61. initializing a first element in the polygon set array as an upper-layer polygon set, with a constant value for the preset embedded parameter;

S62. selecting one of remaining elements as a current-layer polygon set after the first element is removed from the polygon set array; offsetting the upper-layer polygon set inward by the preset embedded parameter to obtain an inward-offset upper-layer polygon set; computing a union of the inward-offset upper-layer polygon set and the current-layer polygon set, updating the current-layer polygon set with an obtained union result, computing a union of the new current-layer polygon set and the upper-layer polygon set, and designating an obtained new union result as a new upper-layer polygon set; and S63. when all the remaining elements in the polygon set array are traversed, saving the updated polygon sets in a new polygon set array in ascending order of height coordinates.

6. The method for digitally generating protective cases for three-dimensional models according to claim 1, wherein the embedded parameter is set to 0.03 mm.

7. The method for digitally generating protective cases for three-dimensional models according to claim 5, wherein in step S8, a specific process of performing surface reconstruction on the protective case model using a triangulation method based on the new contour lines is as follows:

S81. designating two adjacent elements in the new contour line array as an upper layer and a lower layer respectively, calculating average distances between a currently unpaired new contour line in the upper layer and all the new contour lines in the lower layer, and determining whether the new contour line with the shortest average distance in the lower layer has completed triangulation: if the new contour line with the shortest average distance in the lower layer has not completed triangulation, matching it with the currently unpaired new contour line in the upper layer to obtain a matched contour line pair, and connecting the matched contour line pair by drawing lines between their nearest points to complete triangulation; and if the new contour line with the shortest average distance in the lower layer has completed triangulation, internally triangulating the currently unpaired new contour line in the upper layer; and S82. when all adjacent layers in the new contour line array complete triangulation, obtaining a surface reconstruction result.

8. A system for digitally generating protective cases for three-dimensional models, comprising:

an installation direction specification module, configured to specify three-dimensional unit vector as an installation direction of a protective case model in a world coordinate system where an input model with a protective case to be generated is located;

a transformation module, configured to construct a reverse coordinate transformation matrix based on the installation direction of the protective case model, find a reverse matrix of the reverse coordinate transformation matrix to obtain a coordinate transformation matrix, and transform coordinates of the input model using the coordinate transformation matrix;

a pre-processing module, configured to determine whether the transformed input model is closed: pre-process it if it is not closed; and skip the pre-processing if it is closed;

a contour line obtaining module, configured to slice the input model after the closure determination through a preset slice spacing to obtain contour lines of each layer of the input model;

a polygon generation module, configured to construct corresponding two-dimensional polygons by a symmetric difference operation from the obtained contour lines and generate a polygon set;

an iterative update module, configured to iteratively update the generated polygons using a polygon update algorithm with a preset embedded parameter, to obtain updated polygons;

a new contour line obtaining module, configured to convert the updated polygons back into corresponding new contour lines based on height coordinates, and save all the new contour lines in a new contour line array in ascending order of height coordinates; and a protective case output module, configured to perform surface reconstruction on the protective case model in combination with a triangulation method, apply the reverse coordinate transformation matrix to a surface reconstruction result for reverse coordinate transformation, and output a protective case model after the reverse coordinate transformation, to complete digital generation of the protective case for the three-dimensional model.

9. A computer-readable storage medium, wherein the storage medium stores a computer program that, when executed by a processor, implements the method according to claim 1.

10. A computer-readable storage medium, wherein the storage medium stores a computer program that, when executed by a processor, implements the method according to claim 2.

11. A computer-readable storage medium, wherein the storage medium stores a computer program that, when executed by a processor, implements the method according to claim 3.

12. A computer-readable storage medium, wherein the storage medium stores a computer program that, when executed by a processor, implements the method according to claim 4.

13. A computer-readable storage medium, wherein the storage medium stores a computer program that, when executed by a processor, implements the method according to claim 5.

14. A computer-readable storage medium, wherein the storage medium stores a computer program that, when executed by a processor, implements the method according to claim 6.

15. A computer-readable storage medium, wherein the storage medium stores a computer program that, when executed by a processor, implements the method according to claim 7.

16. A computer electronic device, comprising a memory and a processor, wherein the memory is configured to store a computer program; and the processor is configured to execute the computer program to implement the method according to claim 1.

17. A computer electronic device, comprising a memory and a processor, wherein the memory is configured to store a computer program; and the processor is configured to execute the computer program to implement the method according to claim 2.

18. A computer electronic device, comprising a memory and a processor, wherein the memory is configured to store a computer program; and the processor is configured to execute the computer program to implement the method according to claim 3.

19. A computer electronic device, comprising a memory and a processor, wherein the memory is configured to store a computer program; and the processor is configured to execute the computer program to implement the method according to claim 4.

20. A computer electronic device, comprising a memory and a processor, wherein the memory is configured to store a computer program; and the processor is configured to execute the computer program to implement the method according to claim 5.

21. A computer electronic device, comprising a memory and a processor, wherein the memory is configured to store a computer program; and the processor is configured to execute the computer program to implement the method according to claim 6.

22. A computer electronic device, comprising a memory and a processor, wherein the memory is configured to store a computer program; and the processor is configured to execute the computer program to implement the method according to claim 7.

* * * * *